March 14, 1950 — L. B. WINTON — 2,500,443
DIFFERENTIAL PRESSURE INDICATOR
Filed Sept. 27, 1944 — 3 Sheets-Sheet 1
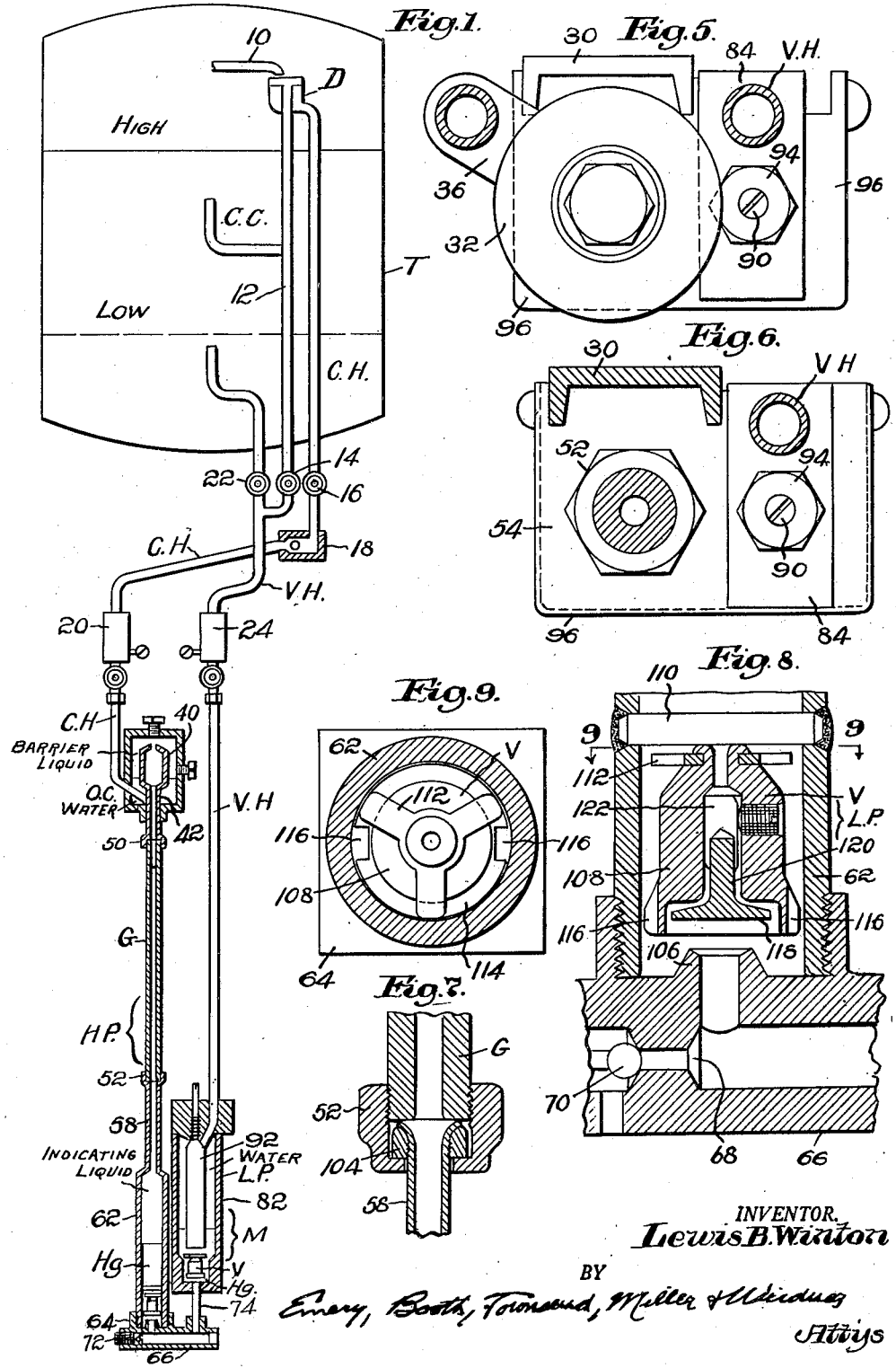

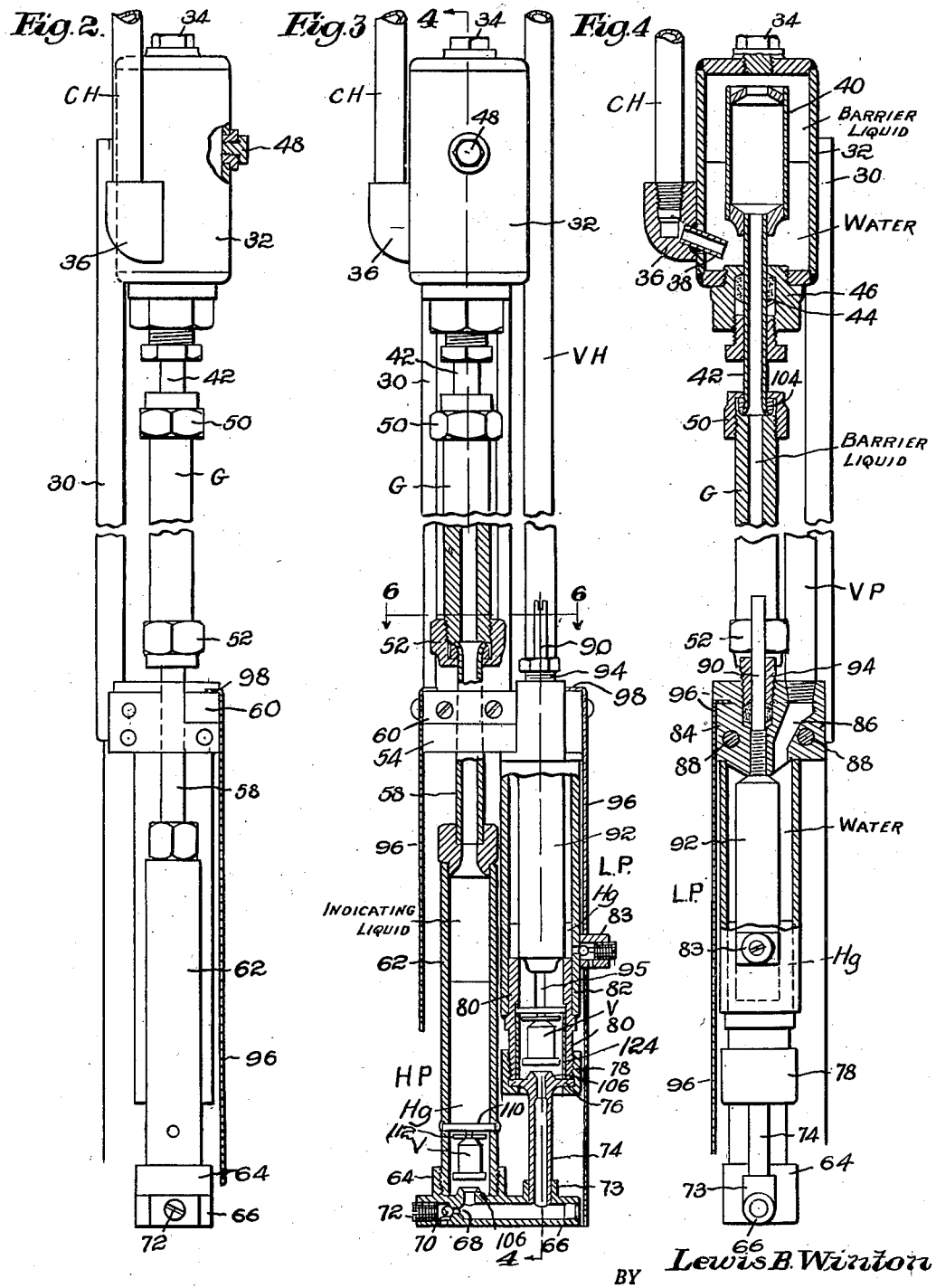

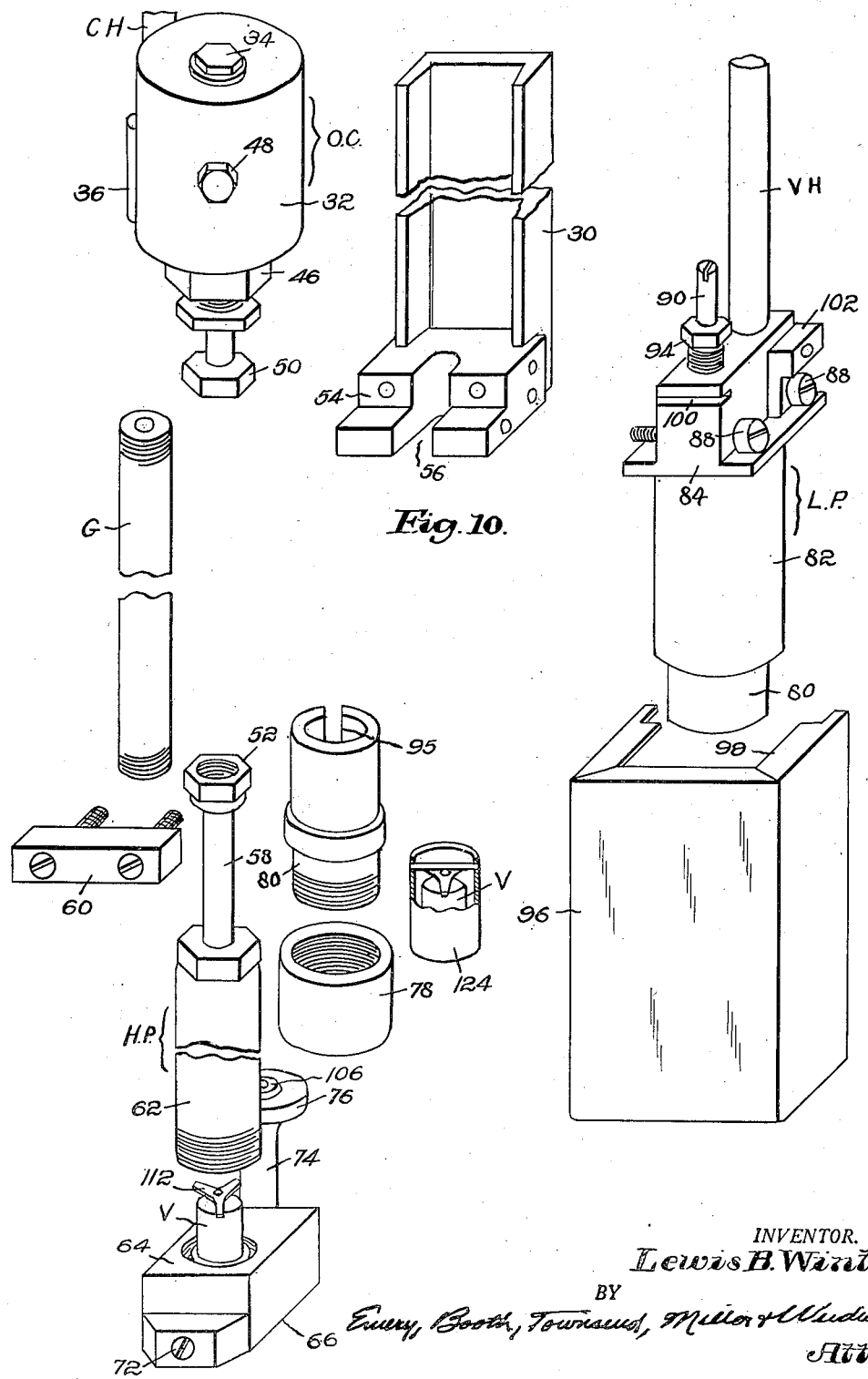

Patented Mar. 14, 1950

2,500,443

UNITED STATES PATENT OFFICE 2,500,443

DIFFERENTIAL PRESSURE INDICATOR

Lewis B. Winton, Greenwich, Conn., assignor, by mesne assignments, to Jerguson Gage & Valve Company, Somerville, Mass., a corporation of Massachusetts Application September 27, 1944, Serial No. 555,990

10 Claims. (Cl. 73—401)

1

This invention relates to differential pressure indicators such as may be used to indicate the level of liquid in a container and more particularly to a manometric gage for the indication of the liquid level in a pressure container which is adapted to give an indication at a remote location, usually much below the liquid level in question. While not limited to such particular application, it is useful in connection with containers under relatively low pressure and where the range of level is relatively great. An instance is a marine feed tank where the range of level may be about 48 inches but the pressure not over 100 pounds per square inch. Objects are to provide an accurate instrument of this character, proof against leakage so as to impair its accuracy in use and well protected against the effect of excessive head on one side or the other. Another object is to provide an instrument resistant to the concussion arising from gunfire and therefore suitable for use on warships.

My invention will be well understood by reference to the following description taken in connection with the accompanying drawings wherein I have shown by way of example one suitable construction of gage and wherein—

Fig. 1 is a diagrammatic view showing the gage mechanism chiefly in section and connected to a tank;

Fig. 2 is a side elevation of the gage mechanism as seen from the left of Fig. 3;

Fig. 3 is a front elevation with parts in section;

Fig. 4 is a section on the line 4—4 of Fig. 3 but the connection marked CH is, for clearness, shown displaced 135° counterclockwise viewing Fig. 5 from its actual position as seen in the latter figure and in Figs. 2 and 3;

Fig. 5 is a plan view of Fig. 3 on a larger scale;

Fig. 6 is a section on the line 6—6 of Fig. 3 on the same enlarged scale;

Fig. 7 is an enlarged view of a portion of Fig. 4;

Fig. 8 is a section on an enlarged scale on the vertical center line of the high pressure chamber and might be considered an enlarged view of a portion of Fig. 3 which appears adjacent the lower left hand of that figure;

Fig. 9 is a section on the line 9—9 of Fig. 8; and

Fig. 10 is an exploded view showing various parts of the mechanism separated from each other and in perspective and partly broken away.

The instrument shown embodies the fundamental principles disclosed in the patent to Tripp and Wadleigh 722,645 in that it comprises a manometer or U-tube M (which in the example shown is actually U-shaped in form) containing a heavy liquid, conveniently mercury and so referred to herein, which measures the liquid level under consideration by responding to the differential between a variable head representing the actual level of liquid in a container and a constant head provided by a datum cup or chamber D placed at a fixed height, usually, as herein, above the normal high water level of the container, and which is maintained constantly full to a given level. The movement of mercury in the U-tube is in markedly reduced ratio to the actual movement in the container and the construction shown is similar to that disclosed in the patent to Simpson and Woods 1,132,399 in that the indication is given not by the surface of the mercury itself but by a column of indicating liquid, conveniently colored water, supported on one of the legs thereof, the upper surface of which moves behind a transparent portion of the instrument such as a tube G similar to the ordinary "gage glass" and which may be referred to as the "gage proper" in view of that similarity. As in the patent last referred to, this column of water supports one leg of a body of barrier liquid, conveniently a light oil (kerosene) immiscible with the water, constituting an inverted U-tube OC (although in the example shown the legs of this so-called U-tube are concentric and not literally U-shaped) while the liquid from the datum cup D which provides the constant head exerts its pressure on the other leg of such inverted U-tube.

The instrument (see Fig. 1) may be connected to the tank T generally in the manner described in my Patent 1,347,860. In Fig. 1 I have shown the datum cup D above the normal high water level in the tank T and adapted to be kept constantly filled with water as by means of a supply pipe 10 discharging thereto, the level being maintained by an overflow pipe 12 which in the present instance has connection through valve 14 to the variable head connection VH presently to be referred to. The datum cup is connected by piping CH (expressive of "constant head") through a valve 16, a safety check valve 18 of usual type and a dirt trap 20 to the lower portion of the cylindrical vessel OC (expressive of "oil chamber") which forms the inverted U-tube above referred to and is the upper portion of the high pressure side HP of the instrument. The variable head connection VH opens from the tank T at a point at or below normal low water mark and leads through valve 22 and a dirt trap 24 to the low pressure side LP of the instrument, the liquid from the tank being superposed directly upon one of the legs of the mercury manometer M. As described in the patent referred to, the overflow pipe 12 may have a connection CC (expressive of "checking connection") opening to the interior of the container at a suitably chosen point intermediate between the normal high and low water levels. By closing the valve 22, the valves 14 and 16 being open, the instrument may be subjected to opposed heads of known value to check the operation thereof.

The spacing of the legs of the manometer M and the location of the datum cup D relative to the center line of the tank may be in accordance with the principles set forth in my Patent 2,334,463.

The application of the terms "high pressure" and "low pressure" to parts of the manometric system is in a sense arbitrary. In the example shown, since the datum cup D is above normal high levels in the boiler, it connects to the high pressure side of the mechanism. As the level of water in the tank falls, the variable head exerted on the low pressure side of the manometer M decreases and the mercury column on the high pressure side sinks, and the surface of the indicating column of water falls in the gage proper G corresponding to the actual descent of the water level in the tank, which is the desirable method of operation.

I have indicated the general nature of the instrument illustrated. I think it will be most convenient now to describe in detail the particular mechanical construction illustrated, after which the importance and utility of various features of construction can more readily be explained.

The indicating mechanism, considered as a whole, is organized on a vertical support or back bone 30 in the form of a channel and which may be secured to a wall, panel board or other support and I will now describe the mechanical elements utilized, beginning at the upper end of this back bone where the constant head connection CH is made and proceeding downwardly along one leg of the manometer and up the other to the point of connection VH of the variable head. At the upper end of the back bone 30 is mounted the oil chamber OC comprising an outer cylindrical container 32 welded (see Fig. 5) to the flanges of the channel 30 and having a filling plug 34 centrally of its upper head. At one side of this container (see Figs. 3 and 5) is an enlargement 36 in the nature of an elbow connection to which the pipe CH leading to the datum cup D is connected and having the branch 38 extending through the wall of the container 32 so that water from the datum chamber is admitted to the lower part of the container. The interior of the container is divided into inner and outer concentric chambers corresponding to legs of an inverted U-tube to receive the body of oil already referred to by means of a cup-like member 40 which is supported on the upper end of a pipe-like section 42, which latter passes through a stuffing box 44 formed in a plug 46 in the bottom end of the container 32. In the wall of the container is provided an overflow plug 48 for determining initially the oil level in the outer chamber.

To the lower end of the pipe 42 is secured by the union connection 50, preferably of a form hereinafter more fully described, at the upper end what has been termed the gage proper G, here shown as a cylindrical tube similar to the conventional "gage glass" but preferably formed of a suitable transparent, concussion resistant "plastic" as hereinafter more fully explained, a similar union 52 at the lower end of this element G providing for its connection to the succeeding parts of the mechanism. We may consider the union 52 as fixed in position. The tube G may be inserted laterally by a movement of approach from the left, viewing Fig. 4, by loosening the stuffing box 44 and sliding the pipe 42 with the chamber 40 carried thereby upwardly to admit the gage tube G.

As best seen in Fig. 10, there is integrally secured to the lower end of the channel 30 a block 54 having a recess 56 therein which receives the pipe section 58 which forms a portion of the union 52, the section being secured in position by a clamping bar 60, and integrally connected with this section 58 is the high pressure chamber 62, in the lower portion of which one of the legs of the mercury manometer operates. Passing for the time being the valve V located in the lower portion of the chamber 62, the lower end of the chamber is screwed into the left-hand lateral branch 64 of a transverse header 66. At one end of the horizontal bore of this header is a mercury drain 68 normally closed by a ball 70 positioned by a set screw 72, the other (right-hand) end being permanently closed as by a plug welded therein. The header 66 has a second upwardly extending branch 73 in which is welded a pipe section 74 having an enlargement 76 at its upper end (see Fig. 3) secured by a union nut 78 against a cooperating seat at the lower end of the shouldered fitting 80 which forms the bottom of the low pressure chamber 82, the shouldered fitting 80 telescoping into the lower end of the chamber 82 and being permanently secured in position as by welding between the shoulder of the fitting and the lower end of the well 82. I again pass over the valve V which is housed in the fitting 80 and to which I shall hereinafter refer.

I herein show a bleeding fitting 83 opening through the wall of the chamber 82 at the equalizing level of the mercury to facilitate initial filling of the instrument, the bleed opening being normally closed by a valve ball supported by a set screw. The use of a bleeding fitting for this purpose is well known and is described in the patent to Dunajeff 1,442,134. If not present, the instrument may be supplied initially with an accurately measured volume of mercury.

The upper end of the chamber 82 is closed by and integrally secured to a block 84 through which is a passage 86 to which the variable pressure connection VP may be made. This block is secured by screws 88 to the side of the block 54 (see Fig. 10) either on the right-hand side as shown in the figure or, if conditions require, on the left-hand side. The passage 86 connecting the variable pressure side of the tank to the low pressure chamber 82 preferably is off from the center of the latter, as seen in Fig. 4, and centrally through the closure block 84 extends the threaded stem 90 of a generally cylindrical displacement member or calibrating rod 92 which extends into the mercury-containing space of the chamber. A stuffing box packing 94 seals the stem 90. By rotating the stem 90 the displacement member 92 is immersed more or less deeply into the mercury. In the example of the invention illustrated the outer diameter of the rod 92 is almost equal to the internal diameter of fitting 80 within which its lower end extends. The differential is so small that it cannot be made graphically obvious on the scale of a patent drawing and I have thought it unnecessary to provide an enlarged view to cover such detail. To insure free passage of mercury in all positions of adjustment of the rod as hereinafter explained, I may provide the wall of the fitting 80 with a slot 95 (Figs. 3 and 10) extending from the upper end of the same to a point below the lowermost position which the cylindrical portion of the rod may take.

A three-sided sheet metal case 96 may be secured to the blocks 54 and 84 to enclose the parts of the structure below those elements in the assembled structure appearing in Fig. 1. The case 96 is here shown as provided with inturned flanges 98 at its upper end which may be supported by the upper surfaces of block 54, clamp 60, the slot 100 in the front of the block 84 and a bracket 102 which may be assembled with either side of the block 84 according to whether it is assembled to the right of part 54 as shown in the drawing or to the left.

In assembling the instrument, the header 66 may be screwed to the high pressure chamber 62 before it is attached to the supporting block 54 of the support or back bone 30. The low pressure unit as shown detached at the right of Fig. 10 may then be secured to the block 54 by means of the screws 88 and the extension 58 of the HP chamber 62 loosely clamped in place by means of bar 60. The union nut 78 may then be set up to press the member 76 against its seat in the part 80, the high pressure unit being moved vertically to accommodate this action and thereafter the clamp 60 is set up tight.

If, as in the Tripp and Wadleigh patent previously referred to, we measure fluctuations of water level by means of a mercury manometer alone, the fluctuations of mercury level are very small for significant changes in the level which it is desired to observe. When, however, as herein, we superpose a light indicating liquid on one leg of the mercury, the cross section of this indicating column may be made such that, while sufficiently large to permit easy observation, the movement of the mercury surface will be multiplied. Thus in the exemplary practical form shown in Figs. 2, 3 and 4, a movement of 48 inches in the main tank corresponds to a movement of the mercury surface in the high pressure well 62 a little less than 2 inches. In the tube G, however, the surface of the indicating liquid in a column ¼ inch in diameter moves through a range of 16 inches. That is, the actual motion is reduced one-third only and significant changes in the tank level are readily observed.

However, it is most important not only that there should be no leakage of mercury but also none of the indicating liquid or of the barrier liquid which separates the latter from the main body of water. On the other hand seepage of water at the CH side of the barrier liquid and at the LP side of the mercury is immaterial as it is insignificant as compared with the amounts in the tank and datum cup.

Because it lends itself to the provision of a small bore of constant area, a tube is desirable for the gage proper G. However, in warships glass tubes cannot be used on account of their fragility, the concussion of the guns causing them to break. In the United States Navy the use of glass tubes is officially prohibited and the usual type of gage is of the so-called flat glass type. This is not well adapted to a structure of the kind under discussion as it requires a large gasket surface under the glass or glasses which may leak, and event a slight leakage of the indicating liquid may impair accuracy, and also because it is difficult to produce and maintain the exact cross section of the indicating column which is required particularly where the most convenient cross-sectional area is very small, as is the case here.

In accordance with my invention I utilize for the tube G a transparent concussion-resisting "plastic," thereby also facilitating the assemblage of the parts as a leak-proof system as will appear, while providing means whereby the indicating and barrier liquids will operate in contact therewith and maintain a satisfactory line of demarcation without migration of one liquid into the other.

I use the word "plastic" in its well understood popular sense of the present day with reference generally to the numerous synthetic resinoid materials, usually condensation products or polymeric materials, and frequently called artificial resins. The list of these is constantly being added to and we may anticipate that many similar products will be developed in the future. The particular material to be utilized must be concussion-resistant and have a satisfactory resistance at the circumambient temperatures involved to the action of the indicating liquid and of the barrier liquid, herein water and light mineral oil. It must, of course, be sufficiently transparent to permit ready reading of the gage. The last condition eliminates many of the so-called plastics and the requirement for resistance to the liquids to be contained eliminates others. A suitable material is clear cast phenol formaldehyde resin available at the present time commercially under the name "cast Bakelite." In this form it is finally solidified under moderate heat, less than 212° F., and at atmospheric pressure and is cast in open molds. It is distinguished from many of the phenol formaldehyde resins which are produced at much higher temperature and under very high pressure in closed molds. It is of such transparency as to be nearly indistinguishable from clear glass in appearance. It is available at the present time in the form of rods which may be bored out to form a tube. I believe that polyvinyl chloride acetate polymers, being among the materials marketed under the trade name "Vinylite," would be suitable, but on account of present war conditions they are not easily procurable and I have not been able to make a complete investigation of the desirability of this material.

The materials referred to, however, are not satisfactory if utilized as mere substitutes for a glass tube. As the liquids traverse back and forth along the height of the tube, the line of demarcation between them is not maintained. Drops of oil become mixed with the water column and increase the effective volume of the indicating liquid which it is important to maintain constant. My observation is that this action is in general characteristic of the plastics and I attribute it to the fact that the cohesive attraction between water and plastic is low relative to the surface tension of the water. I am enabled, however, to utilize a concussion-resistant tube as referred to by adding to the water a suitable surface-active agent (wetting agent) incompatible with the oil and effective to cause the water preferentially to wet the interior of the tube. Again many surface-active agents are known and the list is being added to. A suitable one in the present instance is sodium lauryl sulphate and I have had good results from a material commercially available in the form of a dry powder under the name Duponol ME (E. I. du Pont Company), which consists of a mixture of sodium alkyl sulphates, principally lauryl. In the light of the present disclosure routine tests not in themselves involving invention will disclose the adaptability of a given surface-active agent in connection with a given plastic otherwise adaptable for the purposes of the invention. In the case of the surface-active agent referred to, about ½% by weight of the dry powder may be added to the indicating liquid. The material is indifferent to the oil and its effect on the specific gravity of the water may be ignored.

In the preceding paragraph I have referred to the surface-active agent as "incompatible" with the oil, using that word with a significance common in physical chemistry to signify that one is not soluble in the other. Clearly if the agent were soluble in the oil, it might migrate through the oil to the boiler water and disappear. Its water solution also should not be so readily miscible with the oil as to do the same thing by a purely physical process not technically a solution. In stating that the material is indifferent to the oil, I meant that under the conditions of its use there is no substantial chemical interaction. In the claims I utilize the words "incompatible with the oil" to signify that the agent referred to is insoluble in the oil, that its water solution is not readily miscible therewith and has no appreciable reaction, chemical or physical, with the oil.

I may here remark that a suitable dye for coloring the water to form a readily observed indicating liquid, one which is not soluble in kerosene, gasoline or other light oils and is compatible with the surface-active agent referred to, is National Croceine Scarlet Moo (National Aniline Division, Allied Chemical & Dye Company). The barrier liquid which I have referred to as oil may be a good grade of neutral kerosene of uniform and definite specific gravity, say about .80. Some variation in specific gravity can be tolerated without introducing any important inaccuracy in the performance of the instrument.

To consider the operation of the arrangement of parts described, let us suppose that the gage is filled so that it reads at high. The interior of the tube G is then wet with the indicating liquid. When the level falls, a continuous, microscopically thin film of the indicating liquid clings to the wall of the tube because of the presence of the surface-active agent. This film has no noticeable volume; that is, there is no apparent reduction in the volume of the indicator at normal rates of change of level. The kerosene does not drive off the film and wet the tube. There is a clean separation of the liquids where the columns meet and although the tube is wet with an invisible but continuous film of the indicator there are no random drops of one liquid or the other. If the gage remains at low for at least a week, the kerosene will be found to have crowded off the film of indicator but with no change in appearance or reading of the instrument, the microscopic film of indicator having quietly and unnoticeably joined the main body. If the gage now returns to high, then, because of the wetting agent, the indicating liquid in rising drives off all the kerosene and wets the tube itself, again with a perfectly clean and uniform action. By observing the shape of the dividing meniscus and the appearance of the tube one can tell which liquid is wetting the tube and clearly comprehend the above action.

An important additional utility of the plastic tube as described is that it may be connected up in its place in the instrument without the use of stuffing boxes which are difficult to keep tight, particularly when exposed to oil. It is resilient enough to serve as its own gasket when assembled in a union type of joint, such as those at 50 and 52 already referred to. Referring to Fig. 7, I there show on a larger scale a preferred construction for these joints. A thread may be directly cut on the end portion of the tube to receive the union nut. I have found it unnecessary to reinforce these threads or provide for the anchorage on the tube of metallic male threads. The end surface of the tube is exposed. The cooperating pipe section, 58 in the case of Fig. 7, may have a collar 104 screwed tightly thereon and the end of the tube is then rolled over as shown on the face of this collar and turned true to form a surface opposing the end surface of the tube G. A tight joint can be made without endangering the threads on the plastic when the nut is set up a little more than hand-tight.

In view of this construction the only stuffing boxes utilized in the example of the invention illustrated are those at 44 at the base of the chamber OC and that at 94 about the stem 90 of the calibrating rod 92. Both of these are exposed to water from the constant head and variable head lines respectively, and if seepage occurs it is immaterial to the operation of the instrument. The filling plug 34, the overflow plug 48, the plug 49 in the bottom of the OC chamber and the base connector 64 preferably are provided with true annular surfaces concentric with the axes thereof which are adapted to meet cooperating finished surfaces on the opposed parts to provide in each case a secure metal-to-metal seal. The part 76 is accurately finished and pressed against a finished seat on the end of fitting 80 by the nut 78. Drain plugs 72 and 83 each hold a metal ball firmly pressed against a cooperating seat. All other joints may be welded.

In the first part of the preceding paragraph I have referred to the calibrating rod 92. In designing the instrument we may consider as fixed constants the specific gravity of the liquids in question at the temperatures involved and the range of movement in the tank which it is desired to measure and the location of the datum chamber relative to the normal high water level are known. The bore of the gage proper G and the diameter of the high pressure well 62 may be taken at a given value and we may then calculate the required diameter of the low pressure leg. It is convenient, however, to provide a chamber 82 of a relatively large arbitrary internal diameter and make the effective cross section of that portion thereof in which the surface of the mercury moves in normal operation of the desired area by suspending therein a calibration rod 92 of suitably determined diameter. Thus, for example, we may make the well 82 of tubing nominally 1⅜" in outer diameter with a finished bore giving a cross-sectional area of 1.0297 square inches throughout the range of travel of the mercury surface. If the desired effective cross-sectional area is found to be .5665 square inch, a rod of .768 inch in diameter and therefore .4632 square inch in cross section will reduce the effective area of the chamber to the desired figure.

The position of the mercury marked in Fig. 4 is its lowest normal position corresponding to "High" on the gage. With the gage in service no loss of mercury is expected but there might be a slight loss of indicating liquid resulting in a lowered gage reading for given tank and mercury levels. For instance, if by utilization of the checking connection CC indicated in Fig. 1, as described in my Patent No. 1,347,860 already referred to, the gage reading does not correspond to the known differential but is too low, a loss of indicating liquid would be inferred. By screwing the calibration rod down, the mercury levels will be raised and the gage reading also to bring the gage to exact accuracy. Similarly a correction may be made for a slight inaccuracy in supplying the proper volume of mercury to the gage when placing it in service.

I now come back to the valves V in the HP and LP wells which have hitherto been passed over with mere mention. In Figs. 8 and 9 I have shown the construction at the lower end of the HP well 62. The valves themselves are duplicates. In the bottom of the branch 64 of the header 66 and around the opening into such header there is an elevated valve seat 106 having a narrow seating surface, as clearly seen in Fig. 8. Referring to Fig. 3, at the bottom of LP well 82 a similar seat is shown, provided in that case as a portion of the enlargement 76 at the upper end of the pipe 74. Now viewing Figs. 8 and 9, the valve which cooperates with these seats comprises a buoyant body 108, conveniently solid steel, which is normally held submerged in the mercury column at a position below the normal lowermost position of the mercury surfaces in their respective wells as by means of the pin 110 bridging across the well. The valve body is maintained substantially centrally in the chamber by means of the spider 112 secured to its upper ends and the flange portion 114 at its lower ends which is of a diameter almost equal to the internal diameter of the well, sufficient clearance being provided to permit free movement and the flange being interrupted by ports 116 to permit passage of mercury as the manometer fluctuates. This flange is herein shown as extending below the rest of the valve body to form a depending skirt within which is housed the head or disc 118 of the valve proper which consists of a flexible disc-like head of rubber or the like of about the hardness of an automobile inner tube carried on an integral flexible stem 120 mounted in a metal carrier 122 which is received in a central bore through the valve body and secured by a set screw as shown, the disc being supported in spaced relation to the surface of the valve body immediately above the same and within the peripheral skirt at the lower end of that body.

By referring to Fig. 8 it will be noted that there is a passageway through the valve body and beside the flat of the holder 122 which is engaged by the set screw, which passageway permits escape of air from around the valve proper when mercury is being filled into the instrument in the first instance.

The valve V at the low pressure side is essentially similar. It is here shown, however, (see Fig. 3) as organized in a separate bushing or sleeve 124 traversed by a pin corresponding to stop pin 110 and adapted to be inserted from below into a suitable seat formed therefor in the lower end of fitting 80. See Fig. 10. This sleeve has the same internal diameter as the HP chamber and the two valves V may therefore be in themselves identical in construction. Since the stop pin is carried by the sleeve, the calibration rod 92 may be assembled with the chamber 82 from below through the fitting 80 before the sleeve is inserted. I will now discuss the purpose and operation of these valves V. Clearly by an excess of head on either side of the instrument we can blow all the liquids out. By a relatively slight excess we can blow out the barrier liquid or kerosene which will float up the CH connection into the tank, putting the gage out of order. There are two possible causes of such blow-out, first, the complete break of the gage tube G or of some of the piping connecting the instrument to the tank or, second, which is the most difficult to handle and the most serious in result, a slow leak in the connecting tubes while the gage is in service or while its tank is out of service but presumed to be ready for service at an instant's notice. If we installed a buoyant ball valve or poppet type of valve in the position of the valves V and the mercury level fell slowly, the valve would meet its seat with no force on it and be held closed only by its own weight. This will not hold it sufficiently tight and in the case of marine service the vibration of the engines and the motion of the ship would not permit its holding tight long enough so that any pressure could be build up behind it finally to hold it tight. In the case of the valve V just described, when it just barely falls to its seat upon a slow fall of mercury level, the flexible valve disc seals the narrow seat. Excluding the weight of the valve body which is now exactly balanced by the buoyant force of the mercury, a force is exerted on the upper portion of the disc equal to the area of the circle of the seat multiplied by the unit fluid pressure, which force is exerted on the area of the seat itself which is very small. Therefore, the unit pressure of the rubber disc on its seat far exceeds the liquid pressure. Therefore the valve is tight. Even if the valve body should not further descend, the elasticity of its cylindrical stem permits the valve to seat tighter and tighter if the pressure increases. If the valve did not seat tightly upon the first contact, further downward mercury travel adds more and more of the weight of the main body to the seating force until its full weight is exerted. Any rattling of the valve body 108 due to the vibration, ship motion and ship inclination is not transmitted to the disc 118 to an objectionable degree because of the slender flexible stem 120 which is clear of the body for some distance. Even a strong pressure will not blow the disc through the seat. As the pressure gets greater, the stem itself tries to enter the hole and will withstand a great deal of pressure.

Now let us consider the case of a sudden break in the sight glass or a pipe line. The mercury must pass through the two small ports 116 in the flange 114 at the lower end of the valve body and through the small clearance outward of the same. Such sudden flow sets up a differential pressure which at once drives the body down to seat the valve. This action is very rapid and seats the valve before any considerable velocity is developed in the body of mercury as a whole. The valve disc 118 itself is not driven against the seat, drawing the body behind it, but the body 108 drives the valve proper 118 due to the differential pressure induced by the restriction at the ports. The velocity past the valve seat is much lower than through the ports and disturbing action on the disc itself is avoided. The fact that the valve disc 118 is received within the confines of the depending skirt of the valve body directs the flow away from the disc and avoids fluttering it or disturbing it in such a manner as might cause it to wrinkle or seat in such a position that it would not be tight.

Thus even in the case of a complete break in the sight tube G, while indicating liquid or kerosene will be lost, the valuable mercury will be saved and we can recondition the instrument in confidence that the original quantity of mercury is still present. No mercury will be catapulted out because the valve will have been closed on the occurrence of a slightly abnormal velocity but before dangerous velocity had developed. Nevertheless the valve will not close because of the velocity of the flow of fluid in normal action.

The ball check valve 18 shown in Fig. 1 is of conventional type serving in the case of a broken "glass" to prevent the escape of hot water in quantity dangerous to personnel. Absolute tightness here is not needed.

It will be apparent that the invention may be embodied in other specific forms without departing from the spirit or essential attributes thereof, and the present embodiment should therefore be considered in all respects as illustrative and not restrictive, as is in fact clear in several matters from the description itself. Reference is to be had to the appended claims to indicate those principles of the invention exemplified by the particular embodiment described and which it is desired to secure by Letters Patent.

I claim:

1. A differential gage comprising a conduit system wherein a portion arranged as a U-tube receives a body of heavy manometric liquid and another arranged as an inverted U-tube receives a body of light oil and the system also receives an indicating column of water supported by the manometric liquid in one leg of the U-tube and itself supporting the light oil in one leg of the inverted U-tube, while the liquids the relative pressures of which are to be measured contact the liquid and oil respectively in the other legs, the system including an element of transparent concussion-resisting plastic behind which the surface of contact between the oil and water moves, the water containing a surface-active agent incompatible with the oil and causing the water preferentially to wet the plastic.

2. A differential gage comprising a conduit system wherein a portion arranged as a U-tube receives a body of heavy manometric liquid and another arranged as an inverted U-tube receives a body of light oil and the system also receives an indicating column of water supported by the manometric liquid in one leg of the U-tube and itself supporting the light oil in one leg of the inverted U-tube, while the liquids the relative pressures of which are to be measured contact the liquid and oil respectively in the other legs, the system including a tube of transparent concussion-resisting plastic along which the surface of contact between oil and water moves, the water containing a surface-active agent incompatible with the oil and causing the water preferentially to wet the plastic.

3. In a differential gage of the class described a mercury manometer comprising communicating wells, an extension from one of the wells thereof, a transparent tube having its end presented to the end of said extension and secured in a union joint, an extension from the upper end of the tube similarly secured, a chamber into which said latter extension projects, the bottom wall of the chamber forming a joint with said latter extension between the ends thereof, means to admit water to the lower portion of the chamber, an indicating fluid superposed on the mercury in said well and a lighter barrier liquid in the upper portions of the chamber and extension.

4. In a differential gage of the class described a mercury manometer comprising communicating wells, an extension from one of the wells thereof, a transparent tube having its end presented to the end of said extension and secured in a union joint, an extension from the upper end of the tube similarly secured and supporting an enlarged cup at its upper end, a chamber surrounding the cup and upper portion of the latter extension, the bottom wall of the chamber forming a joint with said latter extension between the ends thereof, means to admit water to the lower portion of the chamber, an indicating fluid superposed on the mercury in said well and a lighter barrier liquid in the upper portion of the chamber and in the cup and upper portion of the extension.

5. In a differential gage an "oil chamber" which provides an inverted U-tube and receives a light barrier liquid in the upper portion thereof and water in the lower portion thereof, the chamber comprising an outer container having a water inlet to its lower portion, an inner container having an open top spaced from the top of the outer container and a seamless integral downward extension passing through the body of water in the outer container and through a wall thereof below the water level, the joint between said extension and wall having a packing which is thus exposed to the water below the surface of the same.

6. In a mercury manometer having a valve seat in a well thereof below the normal low level of the mercury, a buoyant valve normally maintained submerged in the mercury column and which, when so submerged, is buoyed away from the seat, the combination wherein said valve has a valve body and a closure member having a depending flexible stem secured to the body and a flexible disc at the lower end of the stem.

7. In a mercury manometer having a valve seat in a well thereof below the normal low level of the mercury, a buoyant valve normally maintained submerged in the mercury column and which, when so submerged, is buoyed away from the seat, the combination wherein said valve has a valve body having an annular depending skirt and a closure member having a depending flexible stem secured to the body and a flexible disc at the lower end of the stem within the skirt.

8. In a mercury manometer having a valve seat in a well thereof below the normal low level of the mercury, a buoyant valve normally maintained submerged in the mercury column and which, when so submerged, is buoyed away from the seat, the combination wherein said valve has a valve body having an annular depending skirt and a flexible valve disc located within the skirt and flexibly supported in spaced relation to the valve body.

9. In a mercury manometer having a valve seat in a well thereof below the normal low level of the mercury, a buoyant valve normally maintained submerged in the mercury column and which, when so submerged, is buoyed away from the seat, the combination wherein said valve has a valve body having a flange approximating the cross section of the well to center the same, the flange being interrupted by restricted passageways, and a closure member supported at the lower end of the body.

10. In a mercury manometer having a valve seat in a well thereof below the normal low level of the mercury, a buoyant valve normally maintained submerged in the mercury column and which, when so submerged, is buoyed away from the seat, the combination wherein said valve has a valve body having a flange approximating the cross section of the well to center the same, the flange being interrupted by restricted passageways, and a closure member comprising a flexible disc supported in spaced relation to the lower end of the valve body.

LEWIS B. WINTON.

REFERENCES CITED

The following references are of record in the file of this patent:

UNITED STATES PATENTS

| Number | Name | Date |
| --- | --- | --- |
| 92,572 | Blanchard | July 13, 1869 |
| 903,973 | Heiland | Nov. 17, 1908 |
| 1,592,415 | Bristol | July 13, 1926 |
| 1,722,469 | Jones | July 30, 1929 |
| 1,888,424 | Diehl | Nov. 22, 1932 |
| 2,230,973 | Fischer | Feb. 4, 1941 |
| 2,286,919 | McNeill | June 16, 1942 |
| 2,411,508 | Dwyer | Nov. 26, 1946 |

FOREIGN PATENTS

| Number | Country | Date |
| --- | --- | --- |
| 12,255 | Great Britain | 1913 |
| 266,705 | Great Britain | June 9, 1927 |
| 358,312 | Germany | Sept. 7, 1922 |
| 459,937 | France | Sept. 20, 1913 |